US012684597B2

(12) United States Patent
Fujishiro

(10) Patent No.: US 12,684,597 B2
(45) Date of Patent: Jul. 14, 2026

(54) COMMUNICATION CONTROL METHOD

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 453 days.

(21) Appl. No.: 18/163,605

(22) Filed: Feb. 2, 2023

(65) Prior Publication Data

US 2023/0189299 A1 Jun. 15, 2023

Related U.S. Application Data

(63) Continuation of application No. PCT/JP2021/028636, filed on Aug. 2, 2021.

(30) Foreign Application Priority Data

Aug. 3, 2020 (JP) ................................. 2020-131728

(51) Int. Cl.
H04W 72/30 (2023.01)
H04W 72/0457 (2023.01)

(52) U.S. Cl.
CPC ....... H04W 72/30 (2023.01); H04W 72/0457 (2023.01)

(58) Field of Classification Search
CPC . H04W 72/30; H04W 72/0457; H04W 36/02; H04W 36/08; H04W 36/18; H04W 36/26; H04W 36/14; H04W 36/32; H04W 36/36; H04W 36/0061; H04W 36/0007; H04W 4/06; H04W 4/08
See application file for complete search history.

(56) References Cited

U.S. PATENT DOCUMENTS

| | | | |
|---|---|---|---|
| 8,638,706 | B2 | 1/2014 | Cai et al. |
| 10,945,235 | B2 | 3/2021 | Fujishiro et al. |
| 11,330,492 | B2 | 5/2022 | Futaki et al. |
| 2006/0146745 | A1 | 7/2006 | Cai et al. |

(Continued)

FOREIGN PATENT DOCUMENTS

| | | |
|---|---|---|
| CN | 109729559 A | 5/2019 |
| CN | 111065138 A | 4/2020 |

(Continued)

OTHER PUBLICATIONS

Qualcomm Incorporated; "Open Issues on BWP", 3GPP TSG RAN WG1 #91, R1-1720693, Reno, NV, USA, Nov. 27-Dec. 1, 2017, total 15 pages.

(Continued)

*Primary Examiner* — Mohamed A Kamara
(74) *Attorney, Agent, or Firm* — Studebaker Brackett PLLC

(57) ABSTRACT

A communication control method is used in a mobile communication system for providing a multicast broadcast service (MBS). The communication control method includes transmitting, by a base station, MBS data to user equipment in a first cell, transmitting, by the base station to the user equipment, a notification message indicating that an MBS cell being a cell used to transmit or receive the MBS data is to be changed from the first cell to a second cell, and receiving, by the user equipment configured to receive the MBS data from the base station, the notification message from the base station.

5 Claims, 15 Drawing Sheets

(56) References Cited

U.S. PATENT DOCUMENTS

| | | | |
|---|---|---|---|
| 2011/0292911 A1 | 12/2011 | Uemura et al. | |
| 2011/0305183 A1* | 12/2011 | Hsu ................... | H04W 36/0055 |
| | | | 370/312 |
| 2013/0040691 A1 | 2/2013 | Ode | |
| 2013/0044668 A1* | 2/2013 | Purnadi ............ | H04W 36/0058 |
| | | | 370/312 |
| 2014/0036676 A1* | 2/2014 | Purnadi ............ | H04W 36/0058 |
| | | | 370/235 |
| 2016/0080996 A1 | 3/2016 | Fukuta et al. | |
| 2017/0223662 A1* | 8/2017 | Xu ........................ | H04W 48/08 |
| 2018/0035340 A1 | 2/2018 | Fujishiro et al. | |
| 2021/0392555 A1 | 12/2021 | Hiramatsu et al. | |
| 2022/0225199 A1 | 7/2022 | Futaki et al. | |
| 2025/0081216 A1* | 3/2025 | Liu ..................... | H04W 72/046 |

FOREIGN PATENT DOCUMENTS

| | | | |
|---|---|---|---|
| EP | 3 528 538 A1 | 8/2019 | |
| EP | 3675405 A1 | 7/2020 | |
| JP | 2007-525914 A | 9/2007 | |
| JP | 2020-519101 A | 6/2020 | |
| WO | 2010/082521 A1 | 7/2010 | |
| WO | 2011/135693 A1 | 11/2011 | |
| WO | 2014/157396 A1 | 10/2014 | |
| WO | 2016/163547 A1 | 10/2016 | |
| WO | 2018/029932 A1 | 2/2018 | |
| WO | 2018/062370 A1 | 4/2018 | |
| WO | 2019/158291 A1 | 8/2019 | |
| WO | 2020/110825 A1 | 6/2020 | |
| WO | WO-2021142646 A1 * | 7/2021 | |
| WO | 2022/087253 A1 | 4/2022 | |

OTHER PUBLICATIONS

"3rd Generation Partnership Project; Technical Specification Group Radio Access Network; NR; NR and NG-RAN Overall Description; Stage 2", Release 16, 3GPP TS 38.300 V16.2.0 (Jul. 2020), Jul. 2020, pp. 1-148.

* cited by examiner 100                    200

```
MBSInterestIndication-r17 ::=        SEQUENCE {
    criticalExtensions               CHOICE {
        c1                                      CHOICE {
            LTE-MBMSInterestIndication   MBMSInterestIndication-r11-IEs, (REFERENCE TO LTE SPECIFICATIONS)
            NR-MBSInterestIndication     MBSInterestIndication-r17-IEs, (FOR NR)
            spare2 NULL, spare1 NULL
        },
        criticalExtensionsFuture             SEQUENCE {}
    }
}

MBSInterestIndication-r17-IEs ::= SEQUENCE {
    mbs-FreqList-r17              CarrierFreqListMBS-r17        OPTIONAL, (LIST OF ARFCN)
    mbs-Priority-r17             ENUMERATED {true}            OPTIONAL, (PRIORITY TO MULTICAST)
    mbs-Services-r17            MBS-ServiceList-r17          OPTIONAL, (LIST OF TMGI)
    lateNonCriticalExtension     OCTET STRING                 OPTIONAL,
    nonCriticalExtension        SEQUENCE {}                  OPTIONAL
}
```

FIG. 15

COMMUNICATION CONTROL METHOD

RELATED APPLICATIONS

The present application is a continuation based on PCT Application No. PCT/JP2021/028636, filed on Aug. 2, 2021, which claims the benefit of Japanese Patent Application No. 2020-131728 filed on Aug. 3, 2020. The content of which is incorporated by reference herein in their entirety.

TECHNICAL FIELD

The present disclosure relates to a communication control method used in a mobile communication system.

BACKGROUND OF INVENTION

In recent years, a mobile communication system of the fifth generation (5G) has attracted attention. New Radio (NR), which is a Radio Access Technology (RAT) of the 5G System, has features such as high speed, large capacity, high reliability, and low latency compared to Long Term Evolution (LTE), which is a fourth generation radio access technology.

CITATION LIST

Non-Patent Literature

NPL 1: 3GPP Technical Specification "3GPP TS 38.300 V16.2.0 (2020-07)"

SUMMARY

A first aspect provides a communication control method used in a mobile communication system for providing a multicast broadcast service (MBS), the communication control method including transmitting, by a base station, MBS data to a user equipment in a first cell, transmitting, by the base station, to the user equipment, a notification message indicating that an MBS cell being a cell used to transmit or receive the MBS data is to be changed from the first cell to a second cell, and receiving, by the user equipment configured to receive the MBS data from the base station, the notification message from the base station.

A second aspect provides a communication control method used in a mobile communication system for providing a multicast broadcast service (MBS), the communication control method including transmitting, by a base station configured to manage a first cell, to a user equipment in the first cell, a notification message related to MBS transmission in a second cell different from the first cell, wherein the notification message includes radio access technology information indicating a radio access technology used in the second cell for the MBS transmission and/or bandwidth part information indicating a bandwidth part used in the second cell for the MBS transmission.

A third aspect provides a communication control method used in a mobile communication system for providing a multicast broadcast service (MBS), the communication control method including selecting, by a user equipment configured to support a plurality of radio access technologies, a radio access technology used for the user equipment to receive MBS data from among the plurality of radio access technologies, and transmitting, by the user equipment, a message indicating the selected radio access technology to a base station.

BRIEF DESCRIPTION OF THE DRAWINGS

FIG. 15 is a diagram illustrating a configuration example of an MBS indication according to Variation 3.

DESCRIPTION OF EMBODIMENTS

Introduction of multicast broadcast services to the 5G system (NR) has been under study. NR multicast broadcast services are desired to provide enhanced services compared to LTE multicast broadcast services.

The present disclosure provides enhanced multicast broadcast services.

Figure 1:
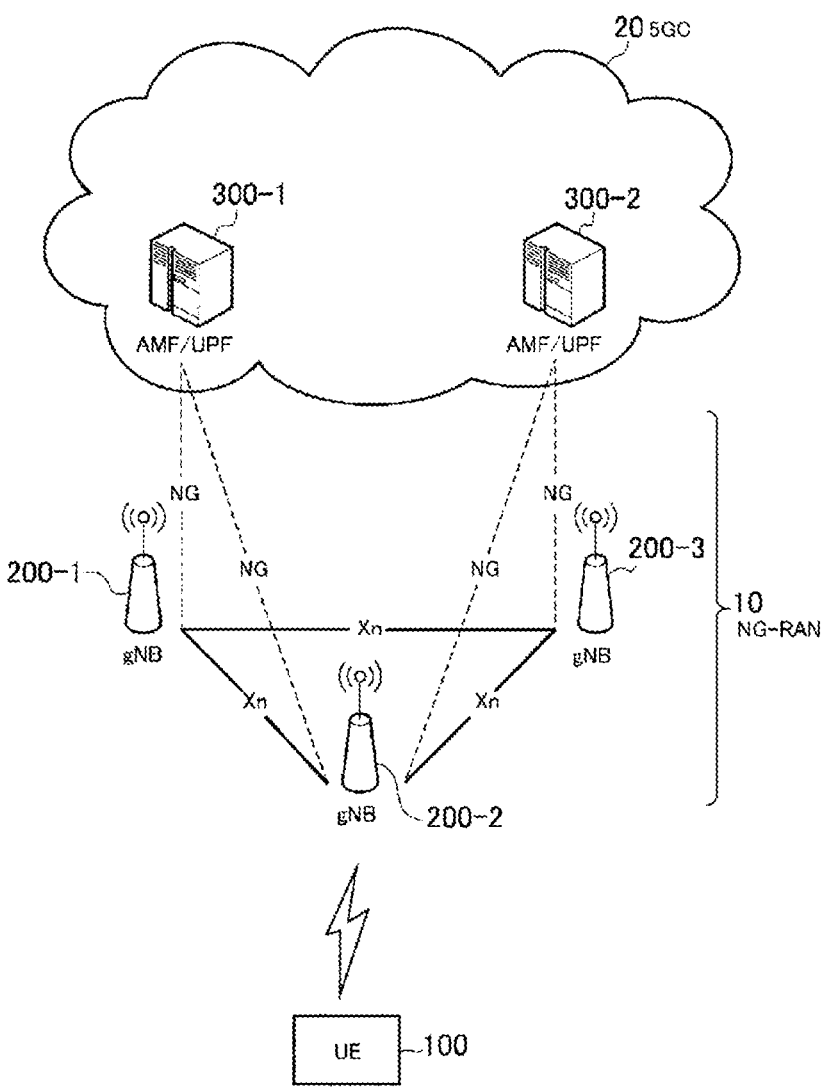
FIG. 1 is a diagram illustrating a configuration of a mobile communication system according to an embodiment.

A mobile communication system according to an embodiment will be described with reference to the drawings. In the description of the drawings, the same or similar parts are denoted by the same or similar reference signs. Configuration of Mobile Communication System First, a configuration of a mobile communication system according to an embodiment will be described. FIG. 1 is a diagram illustrating a configuration of the mobile communication system according to an embodiment. This mobile communication system complies with the 5th Generation System (5GS) of the 3GPP standard. The description below takes the 5GS as an example, but Long Term Evolution (LTE) system may be at least partially applied to the mobile communication system.

As illustrated in FIG. 1, the mobile communication system includes a user equipment (UE) 100, a 5G radio access network (next generation radio access network (NG-RAN)) 10, and a 5G core network (5GC) 20.

The UE 100 is a mobile wireless communication apparatus. The UE 100 may be any apparatus as long as utilized by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), or a flying object or an apparatus provided on a flying object (Aerial UE).

The NG-RAN 10 includes base stations (referred to as "gNBs" in the 5G system) 200. The gNBs 200 are interconnected via an Xn interface, which is an inter-base station interface. Each gNB 200 manages one or a plurality of cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of wireless communication area. The "cell" is also used as a term representing a function or a resource for performing wireless communication with the UE 100. One cell belongs to one carrier frequency.

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signalling. The UPF controls data transfer. The AMF and UPF are connected to the gNB 200 via an NG interface which is an interface between a base station and the core network.

Figure 2:
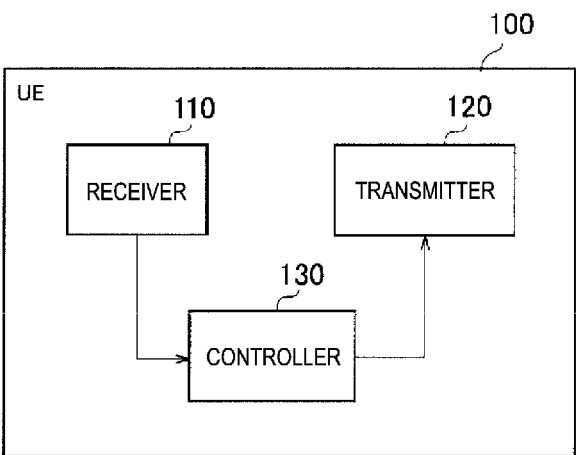
FIG. 2 is a diagram illustrating a configuration of a User Equipment (UE) according to the embodiments.

FIG. 2 is a diagram illustrating a configuration of the UE 100 (user equipment) according to an embodiment.

As illustrated in FIG. 2, the UE 100 includes a receiver 110, a transmitter 120, and a controller 130.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various types of control in the UE 100. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing.

Figure 3:
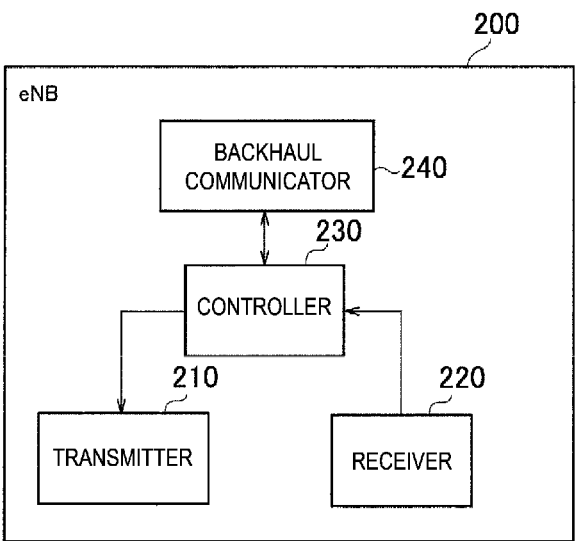
FIG. 3 is a diagram illustrating a configuration of a base station (gNB) according to the embodiments.

FIG. 3 is a diagram illustrating a configuration of the gNB 200 (base station) according to an embodiment.

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of controls for the gNB 200. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and both units may be connected via an F1 interface.

Figure 4:
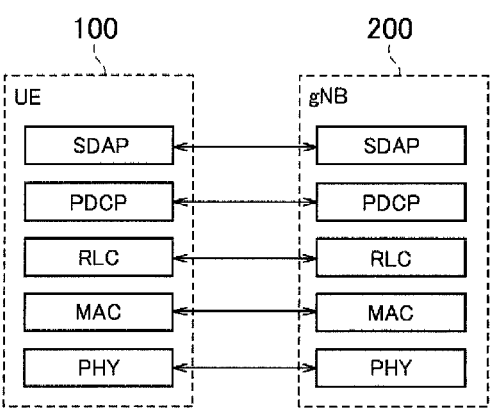
FIG. 4 is a diagram illustrating a configuration of a protocol stack of a radio interface of a user plane handling data.

FIG. 4 is a diagram illustrating a configuration of a protocol stack of a radio interface of a user plane handling data.

As illustrated in FIG. 4, a radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs preferential control of data, retransmission processing using a hybrid ARQ (HARD), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, modulation and coding schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow as the unit of QoS control by a core network and a radio bearer as the unit of QoS control by an access stratum (AS). Note that, when the RAN is connected to the EPC, the SDAP may not be provided.

Figure 5:
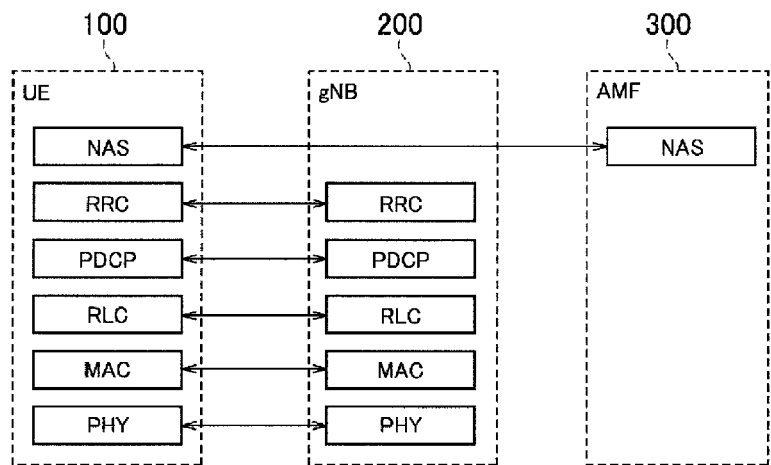
FIG. 5 is a diagram illustrating a configuration of a protocol stack of a radio interface of a control plane handling signalling (control signal).

FIG. 5 is a diagram illustrating a configuration of a protocol stack of a radio interface of a control plane handling signalling (control signal).

As illustrated in FIG. 5, the protocol stack of the radio interface of the control plane includes a Radio Resource Control (RRC) layer and a Non-Access Stratum (NAS) layer instead of the SDAP layer illustrated in FIG. 4.

RRC signalling for various configurations is transmitted between the RRC layer of the UE 100 and the RRC layer of the gNB 200. The RRC layer controls a logical channel, a transport channel, and a physical channel according to establishment, reestablishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the connection between the RRC of the UE 100 and the RRC of the gNB 200 is suspended, the UE 100 is in an RRC inactive state.

The NAS layer which is higher than the RRC layer performs session management, mobility management, and the like. NAS signalling is transmitted between the NAS layer of the UE 100 and the NAS layer of the AMF 300.

Note that the UE 100 includes an application layer other than the protocol of the radio interface.

MBS

An MBS according to an embodiment will be described. The MBS is a service in which the NG-RAN 10 provides broadcast or multicast, that is, point-to-multipoint (PTM) data transmission to the UE 100. The MBS may be referred to as the Multimedia Broadcast and Multicast Service (MBMS).

Use cases of the MBS include public communication, mission critical communication, V2X (Vehicle to Everything) communication, IPv4 or IPv6 multicast delivery, IPTV, group communication, and software delivery.

Figure 6:
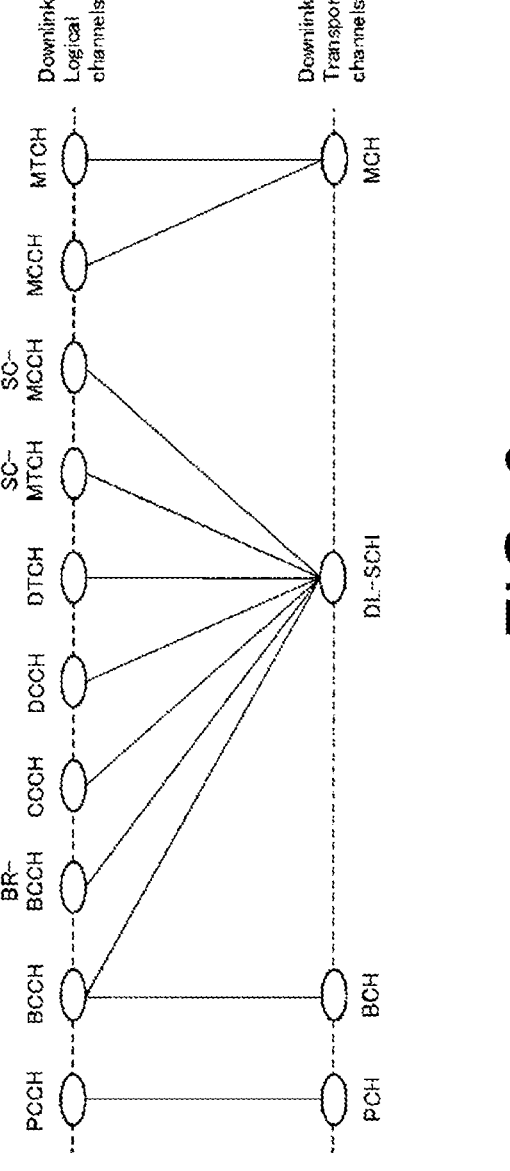
FIG. 6 is a diagram illustrating a correspondence relationship between a downlink Logical channel and a downlink Transport channel according to an embodiment.

MBS Transmission in LTE includes two schemes, i.e., a Multicast Broadcast Single Frequency Network (MBSFN) transmission and Single Cell Point-To-Multipoint (SC-PTM) transmission. FIG. 6 is a diagram illustrating a correspondence relationship between a downlink Logical channel and a downlink Transport channel according to an embodiment.

As illustrated in FIG. 6, the logical channels used for MBSFN transmission are a Multicast Traffic Channel (MTCH) and a Multicast Control Channel (MCCH), and the transport channel used for MBSFN transmission is a Multicast Control Channel (MCH). The MBSFN transmission is designed primarily for multi-cell transmission, and in an MBSFN area including a plurality of cells, each cell synchronously transmits the same signal (the same data) in the same MBSFN subframe.

The logical channels used for SC-PTM transmission are a Single Cell Multicast Traffic Channel (SC-MTCH) and a Single Cell Multicast Control Channel (SC-MCCH), and the transport channel used for SC-PTM transmission is a Downlink Shared Channel (DL-SCH). The SC-PTM transmission is primarily designed for single-cell transmission, and corresponds to broadcast or multicast data transmission on a cell-by-cell basis. The physical channels used for SC-PTM transmission are a Physical Downlink Control Channel (PDCCH) and a Physical Downlink Control Channel (PDSCH), and enables dynamic resource allocation.

Although an example will be mainly described below in which the MBS is provided using the SC-PTM transmission scheme, the MBS may be provided using the MBSFN transmission scheme. In an example mainly described, the MBS is provided by using multicast; however, the MBS may be provided by using broadcast. In the following, the MBS data refers to data transmitted by the MBS transmission, and the MBS transmission refers to multicast or broadcast. A multicast control channel refers to the MCCH or SC-MCCH, and a multicast traffic channel refers to the MTCH or SC-MTCH.

The network can deliver different MBS data for each MBS session. The MBS session is identified by at least one selected from the group consisting of a Temporary Mobile Group Identity (TMGI), a session identifier, and a Group Cell Radio Network Temporary Identifier (G-RNTI). In the following, at least one of these identifiers is referred to as an MBS session identifier. The MBS session identifier may be referred to as an MBS group identifier (or a multicast group identifier).

Figure 7:
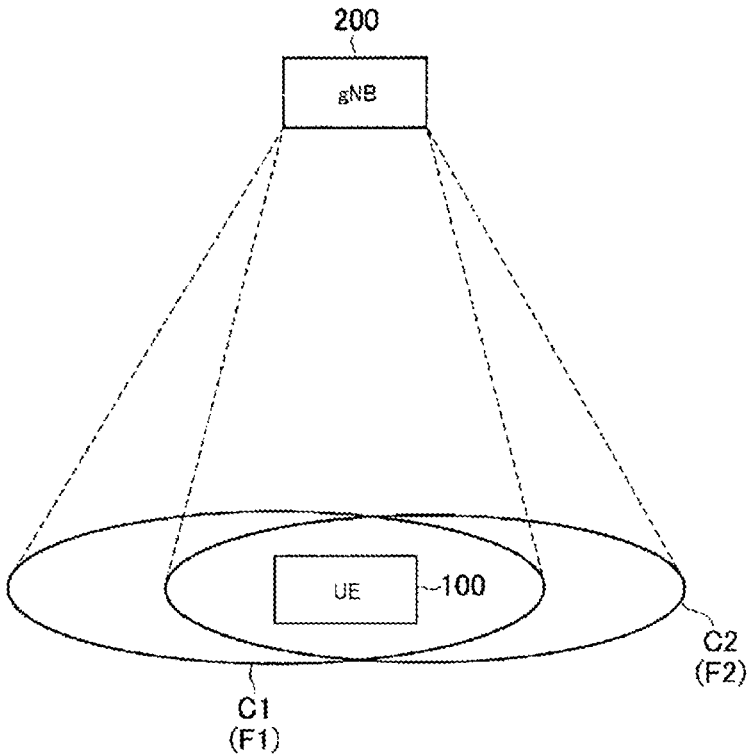
FIG. 7 is a diagram illustrating an example of an operation environment according to the embodiment.

FIG. 7 is a diagram illustrating an example of an operation environment according to the embodiment.

As illustrated in FIG. 7, the gNB 200 manages a cell C1 (first cell) and a cell C2 (second cell). Although the cell C1 and the cell C2 have an equivalent size in the example, the cell C1 and the cell C2 may have different cell sizes. The cell C1 is operated at a frequency F1, and the cell C2 is operated at a frequency F2. That is, the cell C1 and the cell C2 have different frequencies (carrier frequencies). The cell C1 and cell C2 have at least partially overlapping geographic regions. The relationship between such cells may be referred to as neighbor cells. The UE 100 is located in the overlapping area between the cell C1 and the cell C2.

Figure 8:
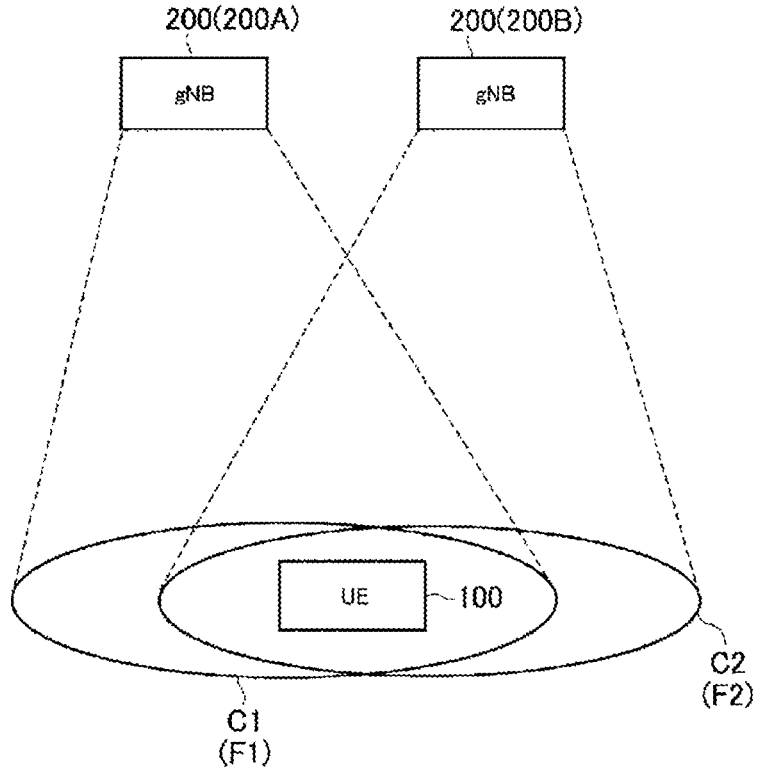
FIG. 8 is a diagram illustrating another example of the operation environment according to the embodiment.

FIG. 8 is a diagram illustrating another example of the operation environment according to the embodiment.

As illustrated in FIG. 8, the example in FIG. 8 differs from the example in FIG. 7 in that the cell C1 and the cell C2 are managed by different base stations. Specifically, the gNB 200A manages the cell C1, and the gNB 200B manages the cell C2. FIG. 8 illustrates an example in which two base stations managing the cell C1 and the cell C2 are base stations of NR, which is the same radio access technology. However, the two base stations managing the cell C1 and the cell C2 may have different radio access technologies. For example, one of the two base stations managing the cell C1 and the cell C2 may be an NR base station (gNB), and the other may be an LTE base station (eNB).

Operation of Mobile Communication System

Given the mobile communication system and MBS described above, operations according to an embodiment will be described.

Figure 9:
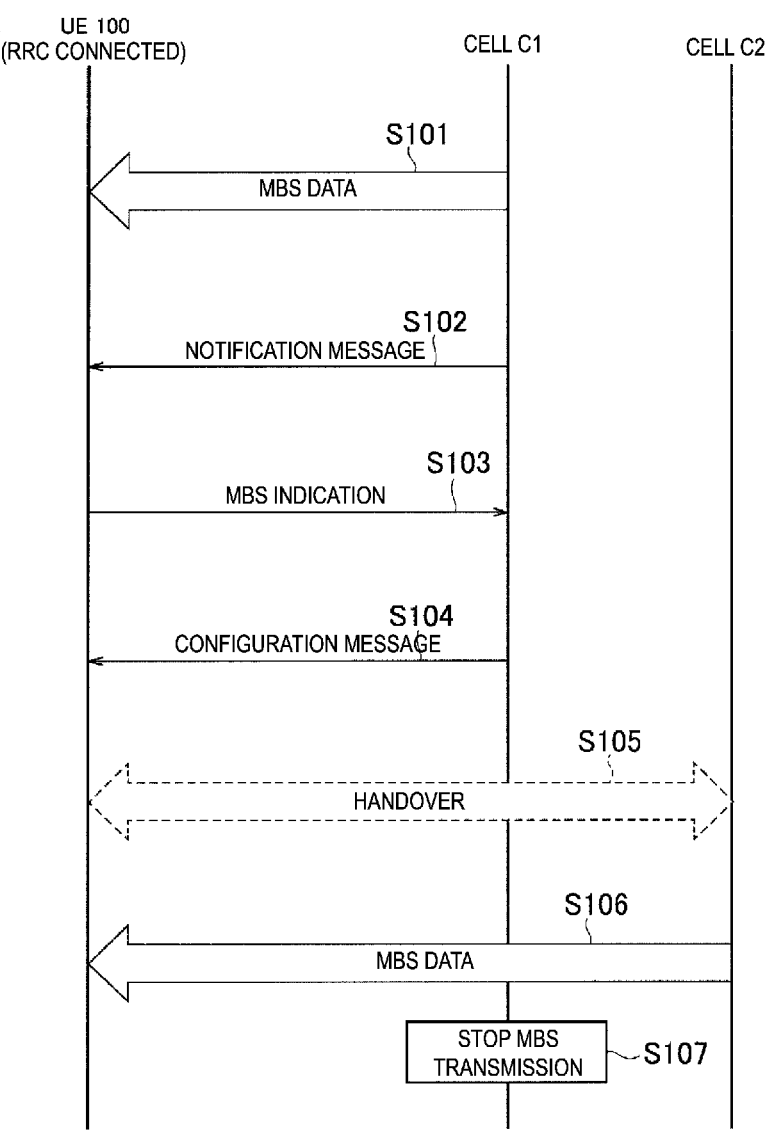
FIG. 9 is a diagram illustrating Operation Example 1 of the mobile communication system according to the embodiment.

The operations according to an embodiment relates to operations of changing an MBS cell being a cell used to transmit or receive MBS data from the cell C1 to the cell C2 in an operation environment illustrated in FIGS. 8 and 9, when the UE 100 receives the MBS data transmitted in cell C1. For example, the gNB 200 managing the cell C1 determines to change the MBS cell from the cell C1 to the cell C2 in response to an increased load due to congestion in the cell C1. This enables the load sharing among the cells.

A communication control method according to an embodiment includes the steps of transmitting, from the gNB 200, the MBS data to the UE 100 in the cell C1, transmitting, from the gNB 200 to the UE 100, a notification message indicating that an MBS cell being a cell used to transmit or receive the MBS data is to be changed from the cell C1 to the cell C2, and receiving, at the UE 100 configured to receive the MBS data from the gNB 200, the notification message from the gNB 200. The transmission of such a notification message to the UE 100 allows the UE 100 to recognize that the MBS cell is to be changed, and to easily continue receiving the MBS data.

The gNB 200 may transmit a notification message to the UE 100 as a control message transmitted on a multicast control channel or system information (System Information Blocks (SIBs)) transmitted on a Broadcast Control Channel (BCCH). The gNB 200 may transmit the notification message as a MAC Control Element (CE) corresponding to a control message of the MAC layer, or an RRC message.

The notification message includes at least one selected from the group consisting of an information element indicating a timing for changing the MBS cell, an identifier indicating the cell C2 (cell identifier), and an identifier indicating the frequency to which the cell C2 belongs (frequency identifier), and an identifier indicating the MBS session where the MBS cell is to be changed (MBS session identifier). In the notification message, at least one selected from the group consisting of the information element indicating the timing for changing the MBS cell, the cell identifier, and the frequency identifier may be associated with the MBS session identifier. Note that, when the notification message is transmitted in the MAC CE, and the multicast traffic channel and the MAC CE are multiplexed, the MBS session identifier is recognizable, eliminating the need to explicitly notify the MBS session identifier.

The notification message may include an information element indicating whether the MBS transmission in the cell C1 is to be stopped. A common information element may be used as the information element indicating that the MBS cell is to be changed from the cell C1 to the cell C2 and the information element indicating whether the MBS transmission in the cell C1 is to be stopped so as to indicate "change" or "stop" depending on the content of the information element.

The notification message may notify that the MBS cell is to be changed within a certain period of time, or include this notification as an information element. The certain period of time may be 0 (zero: immediate), may be the period of an SC-MCCH modification boundary (or an SIB modification boundary), or may be any period configured by the gNB 200. The certain period of time may be in units of SC-MCCH (or SIB) modification boundaries, radio frames, subframes, or minutes and seconds.

The notification message may notify that the transmission cell is to be changed at a certain time, or may include the notification as an information element. The time may be represented by a system frame number (SFN) or a hyper system frame number (H-SFN).

The notification message may notify that the MBS session currently transmitting the MBS data is also in transmission in another cell, or may include the notification as an information element. The notification message may notify information indicating a cell recommended for reception when MBS transmission of the same MBS session is performed in a plurality of cells. In this case, since the same MBS session is transmitted at the same time (dually) in another cell, the UE 100 can change the receiving cell smoothly at any timing.

The notification message may notify that change of the cell for the MBS session where the MBS data is currently being transmitted is recommended (or indicated), or may include the notification as an information element.

FIG. 9 is a diagram illustrating Operation Example 1. In Operation Example 1, the UE 100 is assumed to be in the RRC connected state.

As illustrated in FIG. 9, in step S101, the gNB 200 starts transmission of the MBS data of a certain MBS session (here referred to as MBS session identifier #1) in the cell C1. The UE 100 receives the MBS data from the cell C1. The gNB

200 is assumed to subsequently determine to change, from the cell C1 to the cell C2, the MBS cell to transmit the MBS data corresponding to MBS session identifier #1.

In step S102, the gNB 200 transmits, in the cell C1, a notification message indicating that the MBS cell to transmit the MBS data corresponding to MBS session identifier #1 is to be changed from the cell C1 to the cell C2. The UE 100 receives the notification message.

In step S103, based on the notification message received in step S102, the UE 100 transmits to the gNB 200 an indication (hereinafter referred to as an MBS indication) for the UE 100 to perform handover from the cell C1 to the cell C2. The handover is a cell switching operation of the UE 100 in the RRC connected state.

The MBS indication may be an RRC message. The MBS indication includes an identifier of the cell C2, in which the UE 100 desires to receive the MBS data, and/or the identifier of the frequency (frequency F2) of the cell C2. The MBS indication may include an information element indicating whether the UE 100 prioritize MBS reception over unicast reception.

The MBS indication may be a message that requests the configuration of the MBS reception period for the UE 100 to receive the MBS data of the cell C2 while the UE 100 maintains the connection in the cell C1, or a message including the request as an information element. The MBS reception period is a period in which the UE 100 does not communicate with the cell C1, and may be referred to as an MBS reception gap.

The MBS indication may be transmitted based on conditions related to switching of the MBS cell, and may be transmitted based on other conditions. Only in the latter case, the UE 100 may operate a prohibit timer to restrict the repetitive transmission of the MBS indication. Specifically, the UE 100 starts the prohibit timer at the time of transmission of the MBS indication, and the transmission of the next MBS indication is prohibited until the prohibit timer expires. On the other hand, the UE 100 does not apply (ignore) the prohibit timer when transmitting the MBS indication based on the conditions related to the switching of the MBS cell.

Based on the MBS indication from the UE 100, the gNB 200 recognizes that the UE 100 desires MBS reception (takes interest in the MBS reception) from the cell C2 of the switching destination. In step S104, the gNB 200 transmits a configuration message corresponding to an RRC message to the UE 100 in the cell C1. The configuration message may be an RRC Reconfiguration message. The configuration message may configure handover to the cell C2 for the UE 100 (indicate to the UE 100 handover to the cell C2). The configuration message may configure, for the UE 100, measurement of the cell C2 (frequency F2) and reporting of the measurement performed prior to the handover. In this case, the handover is indicated to the UE 100 after the measurement report. The configuration message may configure the MBS reception period described above for the UE 100.

When the configuration message indicates the handover, in step S105, the UE 100 performs handover from the cell C1 to the cell C2.

In step S106, the gNB 200 starts transmission of the MBS data with MBS session identifier #1 in the cell C2. The UE 100 receives the MBS data from the cell C2. When the MBS reception period is configured for the UE 100, the UE 100 receives the MBS data from the cell C2 during the configured MBS reception period.

In step S107, the gNB 200 stops transmission of the MBS data with MBS session identifier #1 in the cell C1. Step S107 may be performed simultaneously with step S106.

Figure 10:
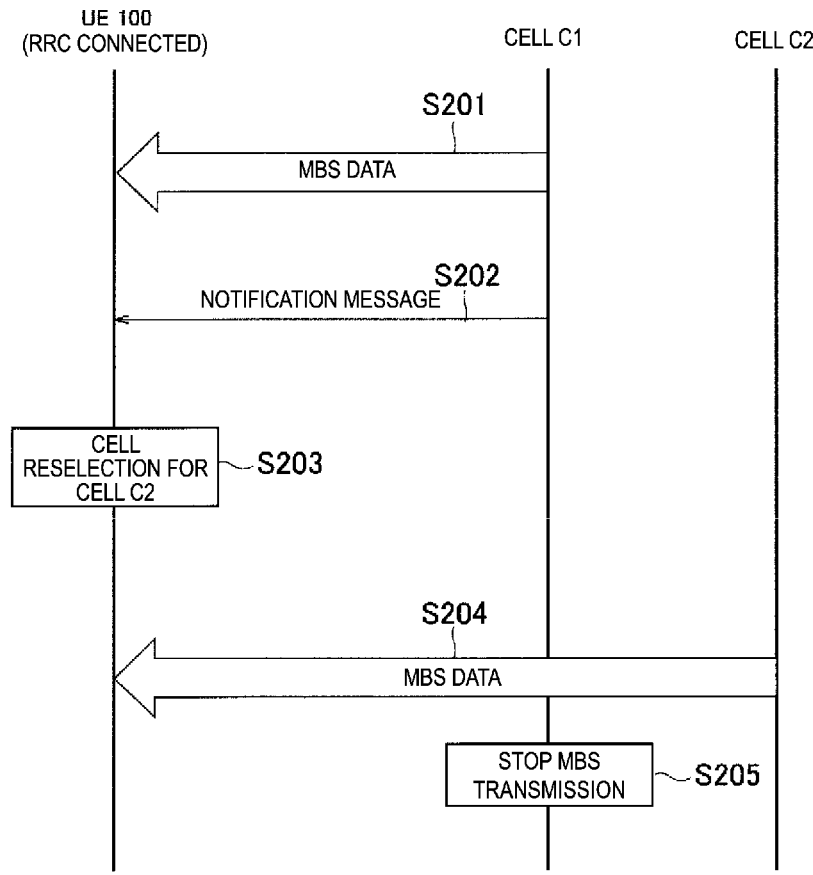
FIG. 10 is a diagram illustrating Operation Example 2 of the mobile communication system according to the embodiment.

FIG. 10 is a diagram illustrating Operation Example 2. In Operation Example 2, the UE 100 is assumed to be in the RRC idle state or the RRC inactive state.

As illustrated in FIG. 10, steps S201 and S202 are steps same as, and/or similar to, steps S101 and S102 described above.

In step S203, the UE 100 performs cell reselection from the cell C1 to the cell C2 based on the notification message received from the gNB 200 (cell C1) in step S202. The cell reselection is a cell switching operation of the UE 100 in the RRC idle state or the RRC inactive state. Here, the UE 100 may perform cell reselection from the cell C1 to the cell C2 by configuring the highest priority for cell reselection for the cell C2 or the frequency F2 to which the cell C2 belongs.

In step S204, the gNB 200 starts transmission of the MBS data with MBS session identifier #1 in the cell C2. The UE 100 receives the MBS data from the cell C2.

In step S205, the gNB 200 stops transmission of the MBS data with MBS session identifier #1 in the cell C1. Step S205 may be performed simultaneously with step S204.

Variation 1

Operation according to Variation 1 of the above-described embodiment will be described while focusing on differences from the above-described embodiment. Variation 1 assumes a scenario in which an NR cell and an LTE cell co-exist.

In the embodiment described above, the cell C2 is assumed to be an NR cell. However, the cell C2 may be an LTE cell. The UE 100 supporting both NR and LTE radio access technologies (RATs) is capable of both MBS reception from the NR cell and MBS transmission from the LTE cell. On the other hand, the UE 100 supporting only NR is capable of MBS reception from the NR cell, but is incapable of MBS reception from the LTE cell. Accordingly, in Variation 1, the RAT of the cell C2 is notified in a notification message.

According to Variation 1, the notification message may have at least one of the functions of the notification message described above. Note that, according to Variation 1, the notification message need not have a function to indicate that the MBS cell is to be changed from the cell C1 to the cell C2. In Variation 1, the cell C1 and the cell C2 may transmit MBS data for different MBS sessions. Each variation described below has assumptions same as, and/or similar to the above assumptions.

Figure 11:
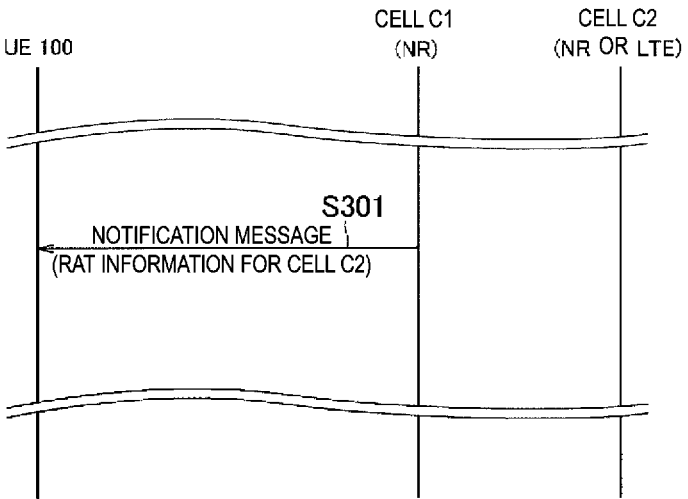
FIG. 11 is a diagram illustrating operations according to Variation 1.

FIG. 11 is a diagram illustrating operations according to Variation 1.

As illustrated in FIG. 11, in step S301, the gNB 200 managing the cell C1 transmits, to the UE 100 in the cell C1, a notification message related to the MBS transmission in the cell C2. The notification message according to Variation 1 includes RAT information indicating the RAT used in the cell C2 for the MBS transmission. The RAT information indicates which of LTE and NR corresponds to the RAT used in the cell C2 for the MBS transmission. According to Variation 1, the notification message may include SIBs transmitted on the BCCH, or may be a message transmitted on the multicast control channel.

When a neighbor cell (cell C2) is performing MBS transmission, the gNB 200 (cell C1) includes, in the notification message transmitted in the cell C1, RAT information identifying whether LTE or NR is used for the MBS transmission, in addition to at least one selected from the group consisting of the MBS session identifier for the MBS transmission, the cell ID of the neighbor cell, and the frequency to which the neighbor cell belongs. The RAT information is, for example, an information element "rat-Type ENUM(lte, nr)."

In Variation 1, in response to receiving the notification message from the gNB 200 (cell C1), the UE 100 in the RRC connected state controls the transmission of the MBS indication described above based on the RAT information included in the notification message, the RAT supported by the UE 100, and the MBS session that the UE takes interest in receiving. The sequence of such operations is the same as, and/or similar to, that in the embodiment described above (see FIG. 9).

For example, based on the RAT information included in the notification message, the UE 100 may determine that the MBS reception is disabled for the MBS session and cell in which and the frequency at which the MBS transmission is being performed by using the RAT different from the RAT supported by the UE 100, and may exclude the MBS session, cell, and frequency from those in which the UE 100 takes interest. The UE 100 may determine that the MBS reception is enabled for the MBS session and cell in which and the frequency at which the MBS transmission is being performed by using the RAT supported by the UE 100, and may consider the MBS session, cell, and frequency as candidates for those in which the UE 100 takes interest.

In Variation 1, in response to receiving the notification message from the gNB 200 (cell C1), the UE 100 in the RRC idle state or the RRC inactive state controls the above-described cell reselection based on the RAT information included in the notification message, the RAT supported by the UE 100, and the MBS session that the UE takes interest in receiving. The sequence of such operations is the same as, and/or similar to, that in the embodiment described above (see FIG. 10).

Variation 2

Operations according to Variation 2 of the above-described embodiment will be described while focusing on differences from the above-described embodiments and the variations thereof.

Figure 12:
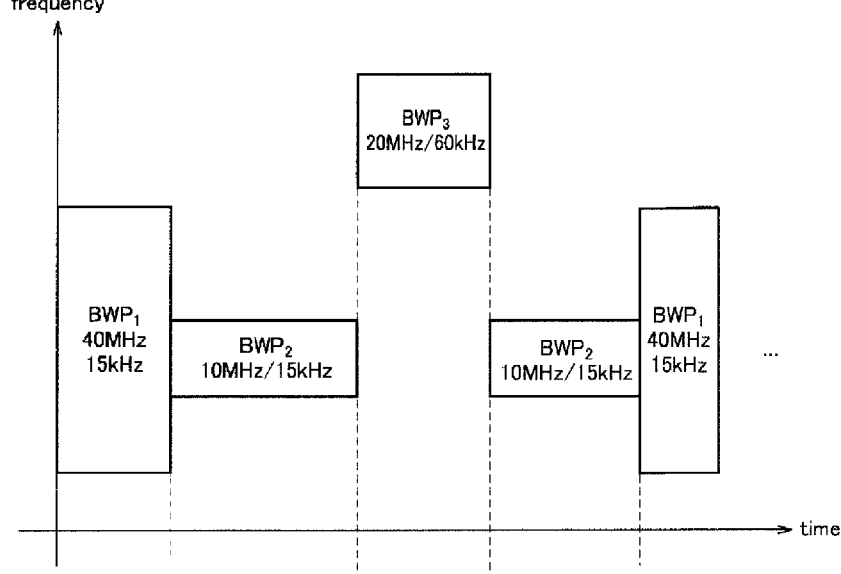
FIG. 12 is a diagram illustrating an example of BWPs.

Variation 2 assumes a scenario in which the cell C2, which is a neighbor cell, is an NR cell. When the cell C2 is an NR cell, the cell C2 may be configured with a Bandwidth Part (BWP) that limits the transmission and/or reception band of the UE 100. FIG. 12 is a diagram illustrating an example of the BWP.

As illustrated in FIG. 12, the BWP is a frequency part corresponding to a part of the entire bandwidth of the cell. FIG. 12 illustrates a $BWP_1$ having a bandwidth of 40 MHz and a subcarrier spacing of 15 kHz, a $BWP_2$ having a bandwidth of 10 MHz and a subcarrier spacing of 15 kHz, and a $BWP_3$ having a bandwidth of 20 MHz and a subcarrier spacing of 60 kHz. A BWP is configured by the gNB 200 for the UE 100, and switching from one BWP to another BWP is controlled by the gNB 200. For example, when the UE 100 is configured with a plurality of BWPs and some of the BWPs are active whereas the others are inactive, the gNB 200 can perform control to switch the active BWP from one BWP to another BWP. The subcarrier spacing and the cyclic prefix can be variably configured for each BWP.

Under such assumptions, the gNB 200 may configure a BWP for MBS transmission. Here, the UE 100 located in the cell C1 preferably recognizes configurations related to the BWP for MBS transmission of the cell C2 in advance. Thus, upon cell switching from the cell C1 to the cell C2, the UE 100 can quickly receive MBS data from the cell C2.

Figure 13:
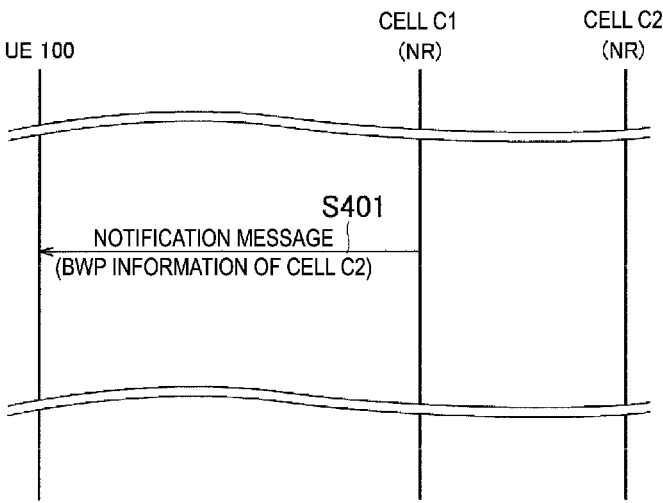
FIG. 13 is a diagram illustrating operations according to Variation 2.

FIG. 13 is a diagram illustrating operations according to Variation 2.

As illustrated in FIG. 13, in step S401, the gNB 200 managing the cell C1 transmits, to the UE 100 in the cell C1, a notification message related to the MBS transmission in the cell C2. The notification message according to Variation 2 includes BWP information indicating a BWP used in the cell C2 for the MBS transmission. The notification message according to Variation 2, like the notification message according to Variation 1, may include RAT information. In this case, the BWP information may be included in the notification message only when the RAT information in the notification message indicates NR. Note that the notification message according to Variation 2 may include SIBs transmitted on the BCCH, or may be a message transmitted on the multicast control channel.

When the neighbor cell (cell C2) is performing MBS transmission, the gNB 200 (cell C1) includes, in the notification message transmitted in the cell C1, BWP information indicating the BWP used for the MBS transmission, in addition to at least one selected from the group consisting of the MBS session identifier for the MBS transmission, the cell ID of the neighbor cell, and the frequency to which the neighbor cell belongs.

The BWP information may include information (BWP identifier) identifying, which BWP is in use for transmission. The BWP information may include at least one of pieces of the configuration information of the BWP including information indicating the frequency allocation and bandwidth of the BWP, information indicating the subcarrier spacing of the BWP (e.g., 15 kHz, 30 kHz, 60 kHz, 120 kHz, or 240 kHz), and information indicating a cyclic prefix length (e.g., a normal length or an extended length) used in the BWP.

For example, the BWP information includes the first Physical Resource Block (PRB) allocation and the bandwidth. The BWP information may include an index value associated with the first PRB allocation and bandwidth.

The BWP information may further include PDCCH configuration information and/or PDSCH configuration information related to the corresponding BWP. The BWP information may include the configuration information of SIBs and/or configuration information (scheduling information) of the multicast control channel related to the corresponding BWP.

Variation 3

Operations according to Variation 3 of the above-described embodiment will be described while focusing on differences from the above-described embodiment. Variation 3, like Variation 1, assumes a scenario in which an NR cell and an LTE cell co-exist.

For the MBS indication described above, when the UE 100 supports a plurality of RATs (NR and LTE), the gNB 200 cannot recognize which RAT is desired to be used by the UE 100 for MBS reception. In particular, when an NR cell and an LTE cell co-exist at the same frequency, identifying the RAT from the frequency identifier included in the MBS indication is difficult.

When the UE 100 can transmit both the MBS indication of NR and the MBS indication of LTE, an unexpected error may occur in the gNB 200. Accordingly, Variation 3 enables selection of the RAT so as to not perform duplicate transmission of the MBS indication of NR and the MBS indication of LTE.

Figure 14:
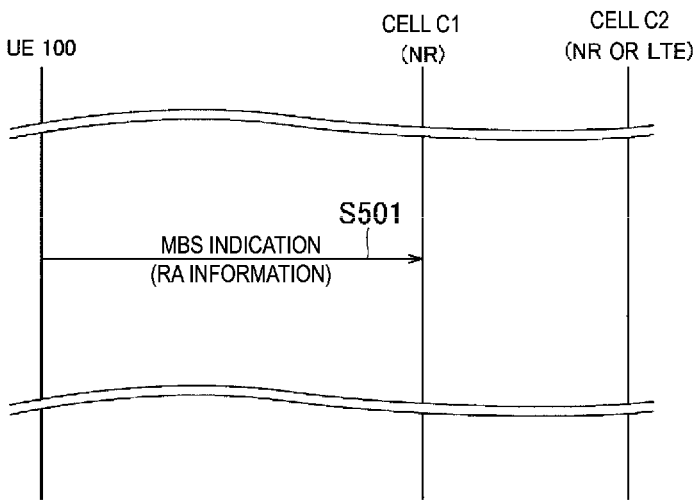
FIG. 14 is a diagram illustrating operations according to Variation 3.

FIG. 14 is a diagram illustrating operations according to Variation 3.

As illustrated in FIG. 14, in step S501, the UE 100 supporting a plurality of RATs selects the RAT used for the UE 100 to receive the MBS data from among the plurality of RATs, and transmits, to the gNB 200, a message indicating the selected RAT (MBS indication). For example, when selecting NR, the UE 100 transmits the MBS indication of NR to the gNB 200, and when selecting LTE, the UE 100 transmits the MB S indication of LTE to the gNB 200.

FIG. 15 is a diagram illustrating a configuration example of the MBS indication according to Variation 3. As illustrated in FIG. 15, the MBS indication (MBSInterestIndication-r17) has a configuration that can be selected (CHOICE) from the MBS indication of LTE (LTE-MBSInterestIndication) and the MBS indication of NR (NR-MBSInterestIndication).

The UE 100 may include, in the MBS indication, an explicit information element (e.g., ENUM(lte, nr)) indicating the selection result. For example, when selecting NR, the UE 100 may transmit the MBS indication of NR to the gNB 200, and when selecting LTE, the UE 100 may transmit, to the gNB 200, the MBS indication of NR including information indicating LTE.

OTHER EMBODIMENTS

The variations described above can not only be separately and independently implemented, but can also be implemented in combination of two or more of the variations.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing the processes to be performed by the UE 100 or the gNB 200 may be integrated, and at least part of the UE 100 or the gNB 200 may be configured as a semiconductor integrated circuit (a chipset or an SoC).

Embodiments have been described above in detail with reference to the drawings, but specific configurations are not limited to those described above, and various design variation can be made without departing from the gist of the present disclosure.

The invention claimed is:

1. A communication control method used in a mobile communication system for providing a multicast broadcast service (MBS), the communication control method comprising:

transmitting, by a base station configured to manage a first cell and a second cell different from the first cell, to a user equipment in the first cell, a notification message related to MBS transmission in a second cell different from the first cell;

performing, by the base station, the MBS transmission in the second cell while maintaining connection between the user equipment and the first cell, wherein the notification message comprises bandwidth part information indicating a bandwidth part used in the second cell for the MBS transmission, and the bandwidth part information comprises information indicating a first Physical Resource Block (PRB) allocation.

2. The communication control method according to claim 1, wherein the bandwidth part information comprises at least one of information indicating a frequency allocation of the bandwidth part, information indicating a subcarrier spacing of the bandwidth part, and information indicating a cyclic prefix length used in the bandwidth part.

3. A base station providing a multicast broadcast service (MBS), the base station comprising:

a controller configured to manage a first cell and a second cell different from the first cell, and a transmitter configured to transmit to a user equipment in the first cell, a notification message related to MBS transmission in a second cell different from the first cell, and transmit to the user equipment MBS data in the second cell while maintaining connection between the user equipment and the first cell, wherein the notification message comprises bandwidth part information indicating a bandwidth part used in the second cell for the MBS transmission, and the bandwidth part information comprises information indicating a first Physical Resource Block (PRB) allocation.

4. An apparatus configured to control a user equipment in a mobile communication system for providing a multicast broadcast service (MBS), the apparatus comprising a processor and a memory coupled to the processor, the processor configured to:

receive from a base station configured to manage a first cell and a second cell different from the first cell, via the first cell, a notification message related to MBS transmission in the second cell, and receive from the base station MBS data in the second cell while maintaining connection in the first cell, wherein the notification message comprises bandwidth part information indicating a bandwidth part used in the second cell for the MBS transmission, and the bandwidth part information comprises information indicating a first Physical Resource Block (PRB) allocation.

5. A user equipment in a mobile communication system for providing a multicast broadcast service (MBS), the user equipment comprising:

a receiver configured to receive from a base station configured to manage a first cell and a second cell different from the first cell, via the first cell, a notification message related to MBS transmission in the second cell, and receive from the base station MBS data in the second cell while maintaining connection in the first cell, wherein the notification message comprises bandwidth part information indicating a bandwidth part used in the second cell for the MBS transmission, and the bandwidth part information comprises information indicating a first Physical Resource Block (PRB) allocation.

* * * * *